(12) United States Patent
Pavlath

(10) Patent No.: US 11,788,840 B2
(45) Date of Patent: Oct. 17, 2023

(54) VIBRATING-MASS SENSOR SYSTEM

(71) Applicant: George Attila Pavlath, Oak Park, CA (US)

(72) Inventor: George Attila Pavlath, Oak Park, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 87 days.

(21) Appl. No.: 17/521,229

(22) Filed: Nov. 8, 2021

(65) Prior Publication Data

US 2023/0144666 A1    May 11, 2023

(51) Int. Cl.
  *G01C 19/56*    (2012.01)
(52) U.S. Cl.
  CPC .................................. *G01C 19/56* (2013.01)
(58) Field of Classification Search
  None
  See application file for complete search history.

(56) References Cited

U.S. PATENT DOCUMENTS

| | | | |
|---|---|---|---|
| 7,213,458 B2 | 5/2007 | Weber et al. | |
| 7,231,824 B2 | 6/2007 | French et al. | |
| 7,444,868 B2 | 11/2008 | Johnson | |
| 9,989,553 B2 | 6/2018 | Waters et al. | |
| 2007/0089510 A1* | 4/2007 | Wyse | G01C 19/5649 |
| | | | 73/504.12 |
| 2016/0025493 A1* | 1/2016 | Stewart | G01C 19/5733 |
| | | | 73/504.12 |
| 2017/0227572 A1 | 8/2017 | Malvern | |
| 2020/0028509 A1 | 1/2020 | Ward et al. | |

FOREIGN PATENT DOCUMENTS

| | | |
|---|---|---|
| CN | 109813341 A | 5/2019 |
| EP | 3470785 A1 | 4/2019 |

OTHER PUBLICATIONS

Extended European Search Report (EESR) dated Mar. 31, 2023 for corresponding EP 22202297.2-1009.

* cited by examiner

*Primary Examiner* — Paul M. West
*Assistant Examiner* — Mark A Shabman
(74) *Attorney, Agent, or Firm* — Tarolli, Sundheim, Covell & Tummino LLP

(57) ABSTRACT

One example includes a radar image interface system. The system includes an image processor configured to receive synthetic aperture radar (SAR) image data associated with a region of interest and to generate a radar image of the region of interest based on the SAR image data. The image processor can be further configured to divide the radar image into a plurality of sequential units corresponding to respective zones of the region of interest. The system also includes a display system configured to display zoomed sequential units corresponding to respective zoomed versions of the sequential units of the radar image to a user. The system further includes an input interface configured to facilitate sequentially indexing through each of the zoomed versions of the sequential units on the display system in response to an indexing input provided by the user.

15 Claims, 2 Drawing Sheets

VIBRATING-MASS SENSOR SYSTEM

TECHNICAL FIELD

This disclosure relates generally to sensor systems, and more specifically to a vibrating-mass sensor system.

BACKGROUND

Vibrating mass sensors can be implemented for measuring a variety of inertial parameters, such as acceleration and rotation. As an example, a vibrating mass sensor can include a vibrating or pendulous mass that is electrostatically controlled to oscillate in response to a drive signal. The oscillatory motion of the vibrating mass can be monitored based on capacitance between sets of electrodes, such that off-axis motion of the vibrating mass that can correspond to effects of inertial motion (e.g., acceleration, rotation, etc.) can be monitored. The vibrating mass can thus be provided a force-rebalance signal to electrostatically force the vibrating mass to a substantially null position in the off axis direction. The amplitude of the force-rebalance signal required to null the vibrating mass to offset the inertial effects can thus correspond to a measurement of the inertial effects.

SUMMARY

One example includes a vibrating-mass sensor system. The system includes a sensor system comprising a vibrating mass and a housing. The housing includes a set of housing drive electrodes. The vibrating mass includes a set of mass drive electrodes that are capacitively coupled to the respective matching set of housing drive electrodes. The system also includes a sensor controller comprising a signal generator configured to generate a drive signal that is provided to one of the set of mass drive electrodes and the set of housing drive electrodes to provide for a periodic oscillatory motion of the vibrating mass. The signal generator includes a polarity reversal component configured to periodically reverse a polarity associated with the drive signal. The sensor controller can be further configured to calculate an inertial parameter of the vibrating mass system in response to the periodic oscillatory motion of the vibrating mass.

Another example includes a method for determining an inertial parameter in a vibrating-mass sensor system sensor. The method includes generating a drive signal and providing the drive signal to electrodes associated with the vibrating mass to provide for periodic oscillatory motion of a vibrating mass. The method also includes periodically reversing a polarity of the drive signal and measuring the periodic oscillatory motion of the vibrating mass. The method further includes generating a force-rebalance signal based on the measured periodic oscillatory motion of the vibrating mass, and calculating the inertial parameter based on an amplitude of the force-rebalance signal.

Another example includes a vibrating mass gyroscope system. The system includes a sensor system comprising a vibrating mass and a housing. The housing includes a set of housing drive electrodes. The vibrating mass includes a set of mass drive electrodes that are capacitively coupled to the respective matching set of housing drive electrodes. The system also includes a gyroscope controller comprising a signal generator configured to generate a drive signal comprising a DC voltage and an AC voltage. The drive signal can be provided to one of the set of mass drive electrodes and the set of housing drive electrodes to provide for a periodic oscillatory motion of the vibrating mass. The signal generator includes a polarity reversal component configured to periodically reverse a polarity associated with the DC voltage and the AC voltage. The sensor controller can be further configured to calculate an inertial parameter of the vibrating mass system in response to the periodic oscillatory motion of the vibrating mass.

DETAILED DESCRIPTION

This disclosure relates generally to sensor systems, and more specifically to a vibrating-mass sensor system. As an example, the vibrating-mass sensor system can correspond to a quad-mass gyroscope that includes a plurality of vibrating masses that oscillate orthogonally with respect to a sensitive axis. The vibrating-mass sensor system includes a sensor system that includes at least one vibrating mass and a housing. The vibrating mass includes a set of sensor electrodes and the housing includes a respective corresponding set of housing electrodes. The vibrating-mass sensor system also includes a sensor controller that includes a signal generator. The signal generator is configured to generate a drive signal that is provided to one of the sensor electrodes and the housing electrodes to provide for periodic oscillatory motion of the vibrating mass along a drive axis. As an example, the drive signal can include a DC voltage and an AC voltage.

The periodic oscillator motion of the vibrating mass is provided at a substantially equal frequency as the resonant frequency of the vibrating mass (e.g., via spring flexures). The DC voltage of the drive signal can be provided to tune the resonant frequency of the vibrating mass via a negative electrostatic spring force. However, providing the DC voltage as part of the drive signal can result in a build-up of charge on the electrodes. Over time, the charge buildup can result in errors (e.g., bias hook, scale-factor errors, bias drift, and/or bias walk) that can negatively affect operation of the vibrating-mass sensor system.

To mitigate errors associated with charge buildup on the vibrating mass, the signal generator can be configured to reverse the polarity of the drive signal. As an example, the signal generator can reverse both the DC and AC voltages of the drive signal. The polarity reversal can be provided at each of predetermined time intervals, such as based on a period of the AC voltage. As an example, the AC voltage can have a frequency that is approximately equal to a resonant frequency of the vibrating mass. Thus, the signal generator can reverse the polarity of the drive signal at each of a predetermined number of periods of the AC voltage. Because the electrostatic force that drives the vibrating mass is based on a square of the voltage of the drive signal (e.g., the sum of the DC and AC voltages), then the reversal of the polarity of the drive signal (e.g., reversing the polarity of both the DC and AC voltages) will not affect the electrostatic driving force. As a result, capacitive charge buildup on the vibrating mass can be mitigated without affecting the driving force acting on the vibrating mass to provide the periodic oscillatory motion of the vibrating mass.

Figure 1:
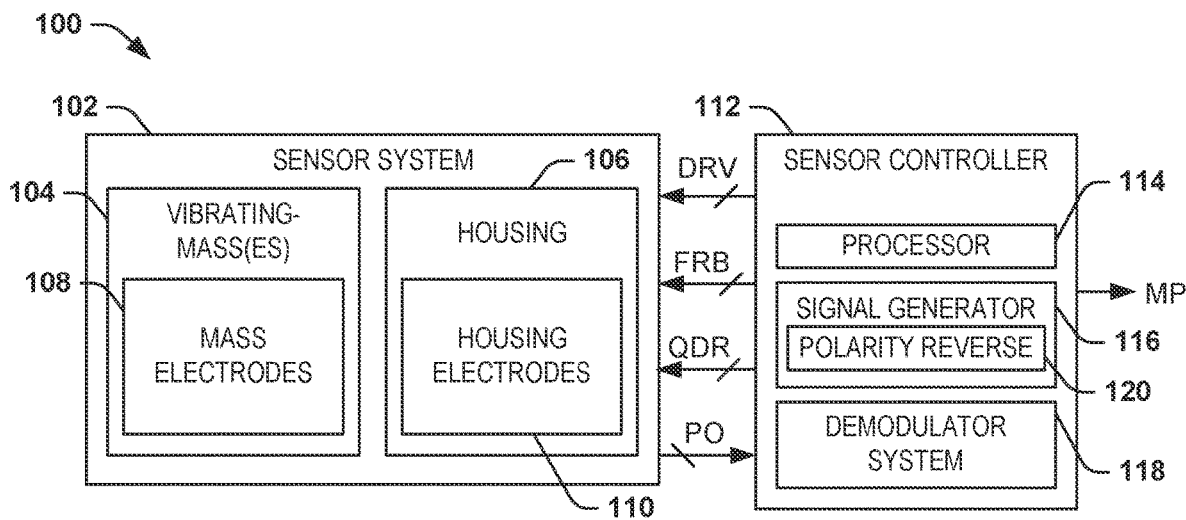
FIG. 1 illustrates an example block diagram of a vibrating-mass sensor system.

FIG. 1 illustrates an example block diagram of a vibrating-mass sensor system 100. The vibrating-mass sensor system 100 can correspond to any of a variety of sensors (e.g., inertial sensors) that implement a vibrating mass to determine a measurable parameter (e.g., acceleration or rotation). As an example, the vibrating-mass sensor system 100 can correspond to a quad-mass gyroscope (QMG) that is configured to determine rotation about a sensitive axis.

In the example of FIG. 1, the vibrating-mass sensor system 100 includes a sensor system 102. The sensor system 102 includes at least one vibrating mass 104 and a housing 106 that can correspond to the structural components accommodating the vibrating mass(es) 104. For example, the vibrating mass(es) 104 can be mechanically coupled to the housing 106 via spring flexures, such that the vibrating mass(es) 104 can move relative to the housing 106. In the example of FIG. 1, the vibrating mass(es) 104 include sets of mass electrodes 108 and the housing 106 includes sets of housing electrodes 110. As an example, the respective sets of mass electrodes 108 and housing electrodes 110 can be capacitively coupled, such that a voltage applied to one of the mass electrodes or the housing electrodes can generate an electrostatic force to provide movement of the vibrating mass(es) 104 relative to the housing 106.

The vibrating-mass sensor system 100 also includes a sensor controller 112. The sensor controller 112 includes a processor 114, a signal generator 116, and a demodulator system 118. The signal generator 116 is configured to generate a drive signal DRV that is provided to a set of drive electrodes of the mass and housing electrodes 108 and 110, a force-rebalance signal FRB that is provided to a set of force-rebalance electrodes of the mass and housing electrodes 108 and 110, and a quadrature rebalance signal QDR that is provided to a set of quadrature electrodes of the mass and housing electrodes 108 and 110. As an example, the quadrature electrodes can be a dedicated set of electrodes, or can correspond to a combination of the drive and force-rebalance electrodes of the mass and housing electrodes 108 and 110. As another example, the sensor controller 112 can be implemented in the digital domain, such that the drive signal DRV, the force-rebalance signal FRB, and the quadrature rebalance signal QDR can be generated digitally and can be converted to analog (e.g., via a digital-to-analog converter (DAC)) as analog signals provided to the sensor system 102.

As described herein, all references to "drive signal DRV", "force-rebalance signal FRB", and "quadrature rebalance signal QDR" corresponds to at least one of each such drive signal DRV, force-rebalance signal FRB, and quadrature rebalance signal QDR, with respect to a respective at least one vibrating mass 104. Thus, for a vibrating-mass sensor system 100 that includes multiple vibrating masses 104, the signal generator 116 can generate a drive signal DRV, a force-rebalance signal FRB, and a quadrature rebalance signal QDR for each of the vibrating masses 104.

The drive signal DRV can include a DC voltage and an AC voltage. The AC voltage can have a frequency that is approximately equal to the resonant frequency of the vibrating mass(es) 104. The DC voltage can be provided to tune the resonant frequency of the vibrating mass(es) 104 via a negative electrostatic spring force, and to provide for demodulation of the drive signal at the frequency of the AC voltage, as opposed to twice the frequency of the AC voltage. Therefore, in response to the drive signal DRV being provided to the drive electrodes of the mass and housing electrodes 108 and 110, each of the vibrating mass(es) 104 can be driven via the electrostatic force in a periodic oscillatory motion at a frequency that is approximately equal to the frequency of the AC voltage. In the example of the vibrating-mass sensor system 100 being arranged as a QMG gyroscope, the vibrating-mass sensor system 100 can include four vibrating masses 104, with each of the vibrating masses 104 being driven along a given axis and with two of the four vibrating masses 104 being 180° out-of-phase of the other two vibrating masses 104.

In response to the application of the drive signals DRV, pickoff signals PO are provided from the sensor system 102 (e.g., from the mass and housing electrodes 108 and 110) to the demodulator system 118. As an example, the pickoff signals PO can correspond to amplitude-modulated pickoff signals that are capacitively coupled to the mass and housing electrodes 108 and 110 in response to motion of the vibrating mass(es) 104. The pickoff signals PO can thus be demodulated via the demodulator system 118 to determine an appropriate magnitude of the respective force-rebalance signals FRB, such as to maintain the periodic oscillatory motion of the vibrating mass(es) 104 and to maintain the vibrating mass(es) 104 in the null position in the sense axis, respectively.

Thus, the processor 114 can calculate the magnitude of the force-rebalance signals FRB in a manner that is indicative of the measurable inertial parameter of the sensor system 102. As an example, a magnitude of the force-rebalance signals FRB, and thus the electrostatic force, that is required to maintain the vibrating mass(es) 104 at the null position along the sense axis can correspond to the measurable inertial parameter (e.g., a rate of rotation of the sensor system 102 about the input axis). Therefore, the magnitude of the force-rebalance signals FRB can be implemented by the processor 114 to calculate the measurable inertial parameter. Accordingly, the sensor controller 112 can provide the measurement of the inertial parameter (e.g., angular rate of rotation about the input axis) as an output signal MP.

As an example, fabrication and electronic variations can result in changes in the separation of the resonant frequencies of the drive axis and the sense axis of each of the vibrating mass(es) 104 due to variation of spring stiffness and mass of the vibrating mass(es) 104. As a result of such frequency separation, a remodulation phase-error can couple quadrature effects into the sense axis, and thus affect the magnitude of the generated force-rebalance signal FRB. Because the magnitude of the force-rebalance signal FRB can correspond to the measurable inertial parameter, such quadrature coupling can create errors in the calculation of the output signal MP. Accordingly, demodulator system 118 can measure the quadrature from the pickoff signals PO, such as based on comparing a quadrature signal received from the pickoff signals PO with a quadrature reference signal, as described in greater detail herein. The signal generator 116 can thus generate the quadrature rebalance signal(s) QDR with respect to the mass and housing electrodes 108 and 110 to substantially mitigate the quadrature motion, and thus the quadrature coupling into the force-rebalance signal FRB.

As described above, the drive signal DRV includes both a DC voltage and an AC voltage, such that the drive signal DRV is a sum of the AC and DC voltages. As also described above, the DC voltage is provided to tune the resonant frequency of the vibrating mass(es) 104 via a negative electrostatic spring force, such that any small difference between the resonant frequency of the vibrating mass(es) 104 and the frequency of the AC voltage can be mitigated. However, providing the DC voltage as part of the drive signal DRV can result in a build-up of charge on the mass and/or housing electrodes 108 and 110. Over time, the charge buildup can result in errors (e.g., bias hook and/or bias walk) that can negatively affect operation of the vibrating-mass sensor system 100. For example, such bias errors can provide errors in the generation of the force-rebalance signal FRB, and thus errors in the measurement of the inertial parameter MP.

In the example of FIG. 1, the signal generator 116 includes a polarity reversal component ("POLARITY REVERSE") 120. The polarity reversal component 120 is configured to periodically reverse the polarity of the drive signal DRV to mitigate errors associated with charge buildup on the vibrating mass(es) 104. As an example, the polarity reversal component 120 can reverse both the DC and AC voltages of the drive signal DRV concurrently, such as by reversing a sign of the DC voltage and by implementing a 180° phase-shift of the AC voltage. For example, the polarity reversal of the drive signal DRV can be provided at each of predetermined time intervals, such as based on an integer multiple of the period of the AC voltage. Thus, the polarity reversal component 120 can reverse the polarity of the drive signal DRV at each of a predetermined number of periods of the AC voltage. As described in greater detail herein, because the electrostatic force that drives the vibrating mass(es) 104 is based on a square of the voltage of the drive signal DRV (e.g., the sum of the DC and AC voltages), then the reversal of the polarity of the drive signal DRV (e.g., reversing the polarity of both the DC and AC voltages) does not affect the electrostatic driving force. As a result, capacitive charge buildup on the vibrating mass(es) 104 can be mitigated without affecting the driving force acting on the vibrating mass(es) 104 to provide the periodic oscillatory motion of the vibrating mass(es) 104. Accordingly, bias errors resulting from the capacitive charge buildup can be mitigated.

Figure 2:
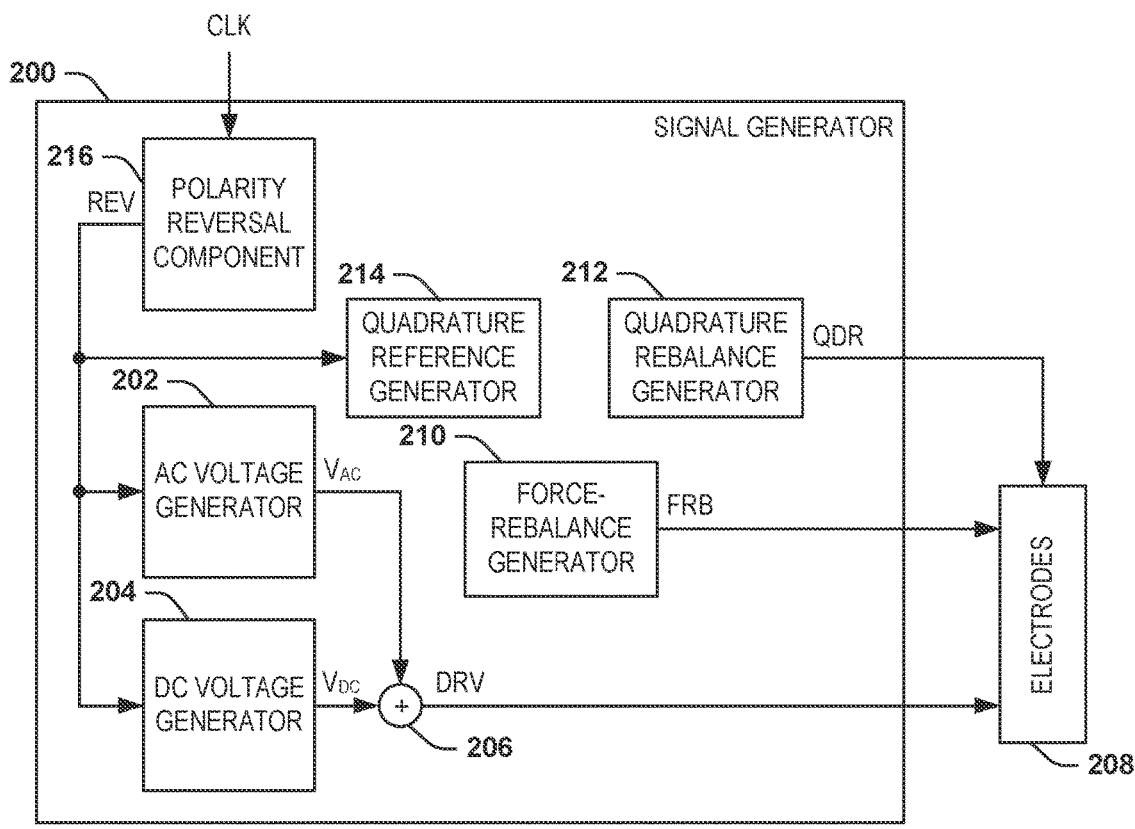
FIG. 2 illustrates an example diagram of a signal generator.

FIG. 2 illustrates an example diagram of a signal generator 200. The signal generator 200 can correspond to the signal generator 116 in the example of FIG. 1. Therefore, reference is to be made to the example of FIG. 1 in the following description of the example of FIG. 2. As an example, the signal generator 200 can correspond to hardware, software, firmware, or a combination thereof. For example, the signal generator 200 can be implemented on or as part of an integrated circuit (IC) chip, a processor, an application specific integrated circuit (ASIC), a field-programmable gate array (FPGA), or any of a variety of devices.

The signal generator 200 includes an AC voltage generator 202 and a DC voltage generator 204. The AC voltage generator 202 is configured to generate an AC voltage $V_{AC}$ that can have a frequency that is approximately equal to the resonant frequency of the vibrating mass(es) 104 of the vibrating-mass sensor system 100. The DC voltage generator 204 is configured to generate a DC voltage $V_{DC}$. As an example, the AC voltage $V_{AC}$ can have an amplitude that is lower than the amplitude of the DC voltage $V_{DC}$. For example, the AC voltage $V_{AC}$ can be less than one voltage (e.g., approximately 0.1 volts) and the DC voltage $V_{DC}$ can be greater than three volts (e.g., approximately 5 volts). In the example of FIG. 2, the DC voltage $V_{DC}$ and the AC voltage $V_{AC}$ are added together via a summation component 206 to generate the drive signal DRV. The drive signal DRV is demonstrated as being provided to electrodes 208, which can correspond to the mass and/or housing electrodes 108 and 110.

The signal generator 200 also includes a force-rebalance signal generator ("FORCE-REBALANCE GENERATOR") 210 and a quadrature rebalance signal generator ("QUADRATURE REBALANCE GENERATOR") 212. The force-rebalance signal generator 210 is configured to generate the force-rebalance signal FRB and the quadrature rebalance signal generator 212 is configured to generate the quadrature rebalance signal QDR. As described above, the force-rebalance signal FRB is generated in response to the pickoff signals PO, such that the force-rebalance signal FRB is generated to have an amplitude to generate a sufficient force to rebalance the vibrating mass(es) 104 (e.g., along an axis orthogonal to the drive axis for a QMG gyroscope).

As also described above, the quadrature rebalance signal QDR is generated to have an amplitude to generate a sufficient force to rebalance quadrature effects acting upon the vibrating mass(es) 104. In the example of FIG. 2, the signal generator 200 also includes a quadrature reference signal generator ("QUADRATURE REFERENCE GENERATOR") 214 that is configured to generate a predetermined quadrature reference signal. The demodulator system 118 can receive a quadrature signal as part of the pickoff signals PO that corresponds to measured quadrature from the vibrating mass(es) 104. The processor 114 can thus compare the received quadrature signal with the quadrature reference signal to determine a difference. Therefore, the quadrature rebalance signal generator 212 can generate the quadrature rebalance signal that is provided to the mass and/or housing electrodes 108 and 110 to provide quadrature rebalance of the vibrating mass(es) 104 to compensate for the difference between the quadrature signal and the quadrature reference signal.

In the example of FIG. 2, the signal generator 200 further includes a polarity reversal component ("POLARITY REVERSAL COMPONENT") 216. The polarity reversal component 216 is configured to provide a reversal signal REV to each of the AC voltage generator 202 and the DC voltage generator 204. Therefore, the reversal signal REV can command the AC voltage generator 202 and the DC voltage generator 204 to periodically reverse the polarity of the AC voltage $V_{AC}$ and the DC voltage $V_{DC}$, respectively. In the example of FIG. 2, the polarity reversal component 216 receives a clock signal CLK that can provide predetermined timing to the polarity reversal of the AC voltage $V_{AC}$ and the DC voltage $V_{DC}$. As described above, the predetermined timing can correspond to an integer multiple of the period of the AC voltage $V_{AC}$.

As described above, the electrostatic force that drives the vibrating mass(es) 104 is based on a square of a drive voltage $V_{DRV}$ corresponding to the drive signal DRV. The drive voltage $V_{DRV}$ can be expressed as follows:

$$V_{DRV} = V_{AC} + V_{DC} \qquad \text{Equation 1}$$

$$V_{DRV}(t) = V_{AC}\cos(2\pi f_{AC}t) + V_{DC} \qquad \text{Equation 2}$$

Where: $f_{AC}t$ is the resonant frequency of the vibrating mass(es) 104.

The electrostatic force $F_{DRV}$ can thus be expressed as:

$$F_{DRV}(t) = V_{DRV}^2 \qquad \text{Equation 3}$$

$$F_{DRV}(t) = V_{DC}^2 + 2*V_{DC}*V_{AC}\cos(2\pi f_{AC}t) + V_{AC}^2\cos^2(2\pi f_{AC}t) \qquad \text{Equation 4}$$

Applying trigonometric identity to the cosine squared term of Equation 4 results in the following expression:

$$F_{DRV}(t) = (V_{DC}^2 + V_{AC}^2/2) + 2*V_{DC}*V_{AC}\cos(2\pi f_{AC}t) + V_{AC}^2/2 \cos(2\pi f_{AC}t) \qquad \text{Equation 5}$$

The first term of Equation 5 represents the DC voltage that results from the squaring of the sum of the DC voltage $V_{DC}$ and the AC voltage $V_{AC}$. The second term of Equation 5 represents the driving force for the vibrating mass(es) 104, and the third term of Equation 5 is the second harmonic of the driving frequency.

Based on the squaring of the AC and DC voltages $V_{AC}$ and $V_{DC}$ in the expression of Equation 5 as affecting the driving force $F_{DRV}(t)$, then the reversal of the polarity of the DC voltage $V_{DC}$ and the AC voltage $V_{AC}$ of the drive signal DRV does not affect the electrostatic driving force $F_{DRV}(t)$. As a result, capacitive charge buildup on the vibrating mass(es) 104 can be mitigated without affecting the driving force $F_{DRV}(t)$ acting on the vibrating mass(es) 104 to provide the periodic oscillatory motion of the vibrating mass(es) 104. Accordingly, bias errors resulting from the capacitive charge buildup can be mitigated.

Furthermore, in the example of FIG. 2, the polarity reversal component 216 provides the reversal signal REV to the quadrature reference signal generator 214. The reversal signal REV can thus command the quadrature reference signal generator 214 to reverse the sign of the quadrature reference signal at the same periodic interval as the AC voltage $V_{AC}$ and the DC voltage $V_{DC}$. In this manner, the processor 114 can properly compare the quadrature signal with the quadrature reference signal, such that the quadrature rebalance signal generator 212 can generate the quadrature rebalance signal QDR to properly accommodate the quadrature effects acting on the vibrating mass(es) 104.

Figure 3:
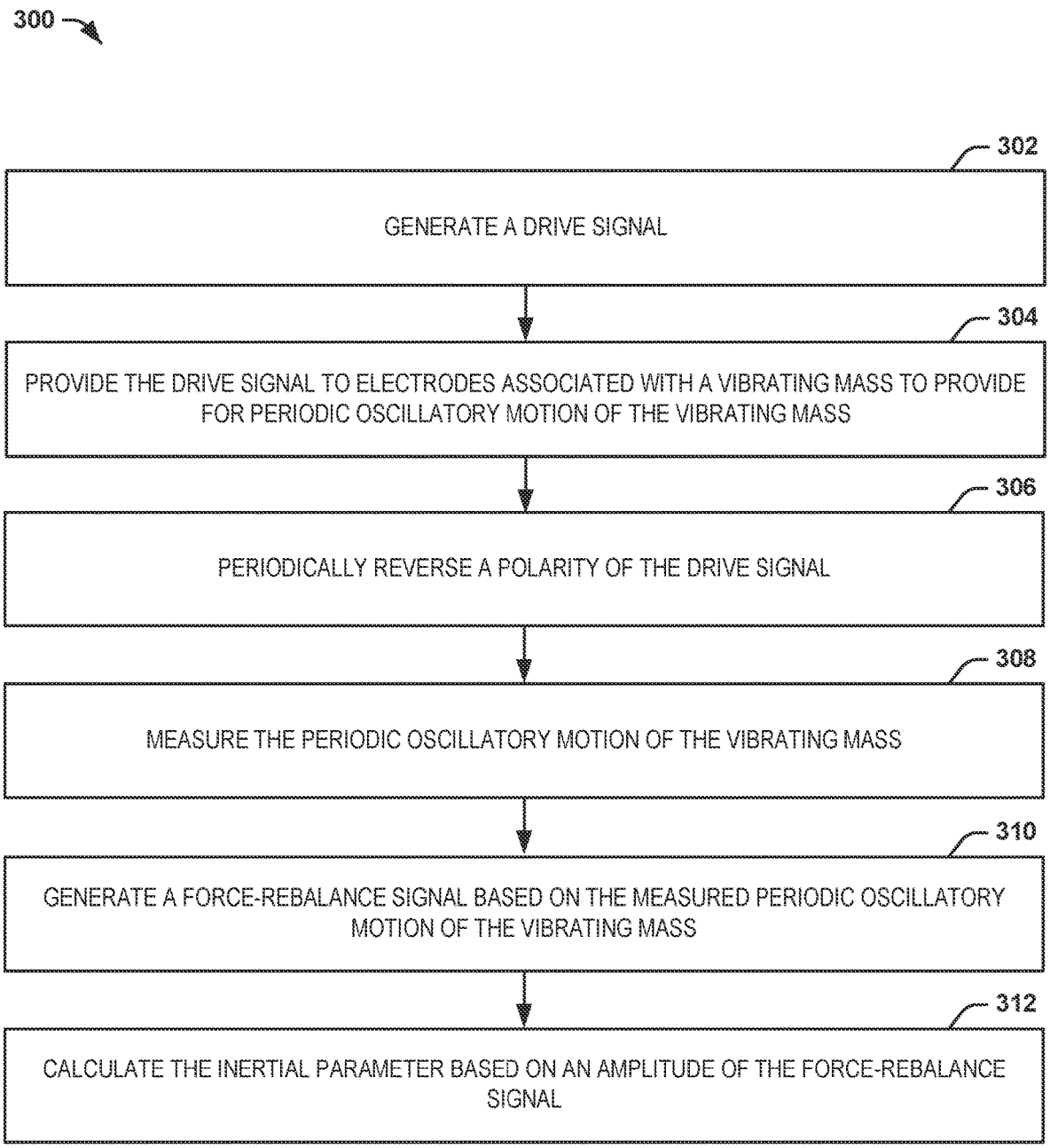
FIG. 3 illustrates an example of a method for determining an inertial parameter in a vibrating-mass sensor system sensor.

In view of the foregoing structural and functional features described above, methods in accordance with various aspects of the present disclosure will be better appreciated with reference to FIG. 3. While, for purposes of simplicity of explanation, the method of FIG. 3 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 3 illustrates an example of a method 300 for determining an inertial parameter in a vibrating-mass sensor system sensor (e.g., the vibrating-mass sensor system 100). At 302, a drive signal (e.g., the drive signal DRV) is generated. At 304, the drive signal is provided to electrodes (e.g., the mass and/or housing electrodes 108 and 110) associated with a vibrating mass (e.g., the vibrating mass 104) to provide for periodic oscillatory motion of the vibrating mass. At 306, a polarity of the drive signal is periodically reversed. At 308, the periodic oscillatory motion of the vibrating mass is measured. At 310, a force-rebalance signal (e.g., the force-rebalance signal FRB) is generated based on the measured periodic oscillatory motion of the vibrating mass. At 312, the inertial parameter (e.g., the measurable inertial parameter MP) is calculated based on an amplitude of the force-rebalance signal.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A vibrating-mass sensor system comprising:
a sensor system comprising a vibrating mass and a housing, the housing comprising a set of housing drive electrodes, the vibrating mass comprising a set of mass drive electrodes that are capacitively coupled to the respective matching set of housing drive electrodes; and
a sensor controller comprising a signal generator configured to generate a drive signal that is provided to one of the set of mass drive electrodes and the set of housing drive electrodes to provide for a periodic oscillatory motion of the vibrating mass, the signal generator comprising;
a DC voltage generator configured to generate a DC voltage associated with the drive signal;
an AC voltage generator configured to generate an AC voltage associated with the drive signal; and
a quadrature reference signal generator configured to generate a quadrature reference signal; and
a polarity reversal component configured to periodically and concurrently reverse a polarity associated with each of the DC voltage, the AC voltage, and the quadrature reference signal, the sensor controller being further configured to calculate an inertial parameter of the vibrating mass system in response to the periodic oscillatory motion of the vibrating mass.

2. The system of claim 1, wherein the signal generator is configured to periodically reverse the polarity associated with each of the DC voltage and the AC voltage at each of an integer number of periods associated with the AC voltage.

3. The system of claim 1, wherein the vibrating-mass sensor system is configured as a vibrating mass gyroscope.

4. The system of claim 3, wherein the vibrating mass is configured as an XY-plane vibrating mass comprising a set of X-axis electrodes and a set of Y-axis electrodes, and wherein the housing comprises a respective corresponding set of X-axis electrodes and a set of Y-axis electrodes.

5. The system of claim 4, wherein the drive signal is provided to one of the sets of X-axis electrodes and Y-axis electrodes associated with one of the vibrating mass and the housing.

6. The system of claim 5, wherein the other of the sets of X-axis electrodes and Y-axis electrodes associated with one of the vibrating mass and the housing corresponds to a set of force-rebalance electrodes, wherein the signal generator is configured to generate a force-rebalance signal that is applied to the set of force-rebalance electrodes.

7. The system of claim 6, wherein the sensor controller is configured to determine rotation about a sensitive axis of the vibrating mass gyroscope based on an amplitude of the force-rebalance signal.

8. The system of claim 3, wherein the signal generator is configured to generate a quadrature reference signal, wherein the sensor controller is configured to generate a quadrature rebalance signal based on comparing a quadrature signal received from the sensor system with the quadrature reference signal, wherein the polarity reversal component configured to periodically reverse a polarity associated with the quadrature reference signal.

9. A method for determining an inertial parameter in a vibrating-mass sensor system sensor, the method comprising:
generating a drive signal;
providing the drive signal to electrodes associated with a vibrating mass to provide for periodic oscillatory motion of the vibrating mass;

generating a quadrature reference signal;
periodically reversing a polarity of the drive signal and the quadrature reference signal;
comparing a quadrature signal with the quadrature reference signal;
measuring the periodic oscillatory motion of the vibrating mass and the quadrature signal associated with the vibrating mass;
generating a quadrature rebalance signal that is provided to the vibrating mass to substantially cancel quadrature associated with the vibrating mass;
generating a force-rebalance signal based on the measured periodic oscillatory motion of the vibrating mass; and
calculating the inertial parameter based on an amplitude of the force-rebalance signal.

10. The method of claim 9, wherein generating the drive signal comprises:
generating a DC voltage;
generating an AC voltage having a frequency that is approximately equal to a resonant frequency of the vibrating mass; and
adding the DC voltage and the AC voltage to generate the drive signal.

11. The method of claim 10, wherein periodically reversing the polarity comprises periodically reversing the polarity associated with each of the DC voltage and the AC voltage at each of an integer number of periods associated with the AC voltage.

12. A vibrating mass gyroscope system comprising:
a sensor system comprising a vibrating mass and a housing, the housing comprising a set of housing drive electrodes, the vibrating mass comprising a set of mass drive electrodes that are capacitively coupled to the respective matching set of housing drive electrodes; and
a gyroscope controller comprising a signal generator configured to generate a drive signal comprising a DC voltage and an AC voltage, the drive signal being provided to one of the set of mass drive electrodes and the set of housing drive electrodes to provide for a periodic oscillatory motion of the vibrating mass, the signal generator comprising a polarity reversal component configured to periodically reverse a polarity associated with the DC voltage and the AC voltage, a quadrature reference signal generator configured to generate a quadrature reference signal, and a quadrature rebalance signal generator configured to generate a quadrature rebalance signal, wherein a sensor controller is configured to compare a quadrature signal received from the sensor system with the quadrature reference signal, wherein the polarity reversal component configured to periodically reverse a polarity associated with the quadrature reference signal, the sensor controller being further configured to calculate an inertial parameter of the vibrating mass system in response to the periodic oscillatory motion of the vibrating mass.

13. The system of claim 12, wherein the signal generator is configured to periodically reverse the polarity associated with each of the DC voltage and the AC voltage at each of an integer number of periods associated with the AC voltage.

14. The system of claim 12, wherein the signal generator comprises:
a DC voltage generator configured to generate the DC voltage associated with the drive signal;
an AC voltage generator configured to generate the AC voltage associated with the drive signal; and
a force-rebalance signal generator configured to generate a force-rebalance signal.

15. The system of claim 14, wherein the sensor controller is configured to determine rotation about a sensitive axis of the vibrating mass gyroscope based on an amplitude of the force-rebalance signal.

* * * * *